No. 651,657. Patented June 12, 1900.
J. ESHE.
PROCESS OF MAKING ARTIFICIAL STONE.
(Application filed Jan. 22, 1900.)
(No Model.)
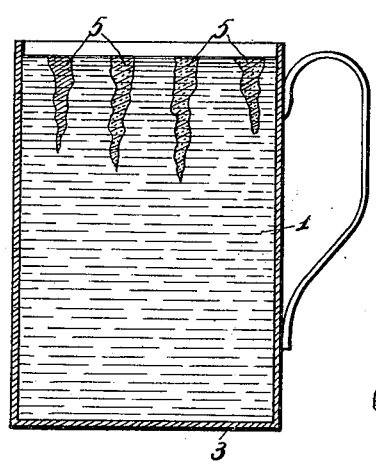
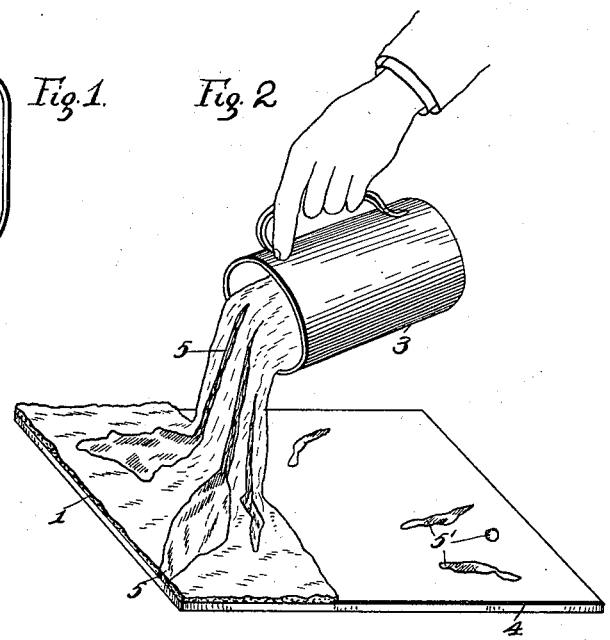
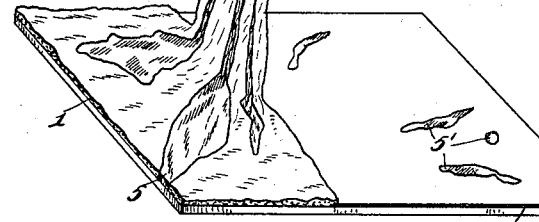
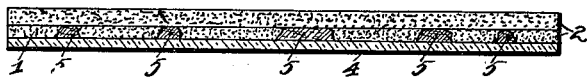
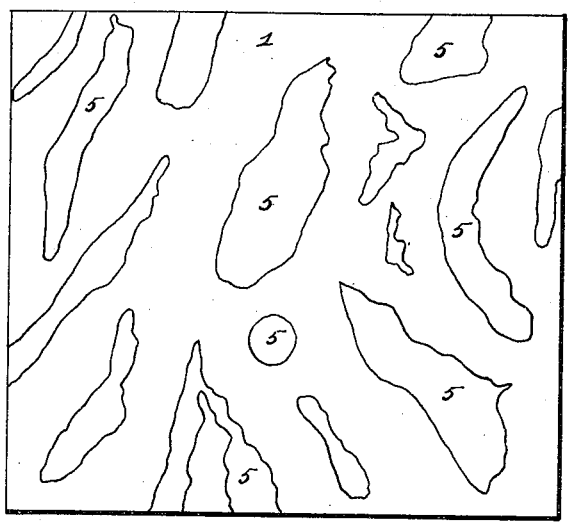
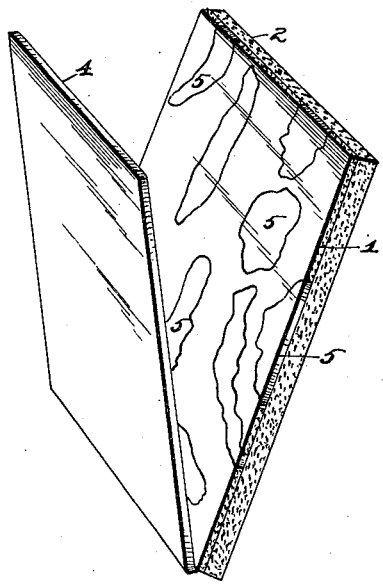
Witnesses
G. L. Belfry.
C B Townsille
Inventor.
John Eshe
By Emil Starek Atty.
THE NORRIS PETERS CO., PHOTO-LITHO., WASHINGTON, D. C.

UNITED STATES PATENT OFFICE.

JOHN ESHE, OF ST. LOUIS, MISSOURI.

PROCESS OF MAKING ARTIFICIAL STONE.

SPECIFICATION forming part of Letters Patent No. 651,657, dated June 12, 1900.

Application filed January 22, 1900. Serial No. 2,361. (No specimens.)

*To all whom it may concern:*

Be it known that I, JOHN ESHE, a citizen of the United States, residing at St. Louis, in the State of Missouri, have invented certain new and useful Improvements in Processes of Making Artificial Stone, of which the following is a full, clear, and exact description, reference being had to the accompanying drawings, forming a part hereof.

My invention has relation to improvements in processes of making artificial stone; and it consists in the novel series of steps more fully set forth in the specification and pointed out in the claim.

In the drawings, Figure 1 is a vertical section of a can containing the facing composition ready for pouring. Fig. 2 is a perspective view of a plate of glass, showing the facing composition in the act of being poured. Fig. 3 is an end view of the completed slab resting on the glass plate. Fig. 4 is a perspective view of the completed slab in the act of being peeled off or removed from the glass plate, and Fig. 5 is a top plan of the completed slab.

The present invention has relation to that class of artificial stone which may be used as a substitute for marble, especially for the interior finish of buildings, and has for its object the simplifying of the method of distributing the colors in the facing or exposed surface of the finished slab and the cheapening of the finished product for the market.

In detail the invention may be described as follows:

The completed slab is composed of a facing or outer layer 1 and a backing or body portion 2. The composition of the facing is in the majority of cases ground plaster-of-paris with or without an admixture of sand, such composition being mixed with a suitable proportion of water to the consistency of thick cream or milk of lime and is placed into a can 3, from which it is poured onto a clean surface of glass 4 or any equivalent smooth glazed surface, and allowed to set in the manner of plaster compositions well known in the art. To impart to this layer a mottled or colored appearance, suitable mixtures of water-colors 5 (either dry or held in suspension in water and being of substantially the same consistency as the plaster mixture in the can) are introduced over the surface of the liquid contained in the can, such colors by slight stirring of the mass penetrating or gravitating to a suitable distance below the surface of the composition. The contents is then poured over the glass, (see Fig. 2,) the colored portions remaining as distinct deposits from the plaster mixture and setting with it after being once poured. After this facing has well set and while yet moist the body or layer 2 is applied in substantially the same manner—that is, it is poured over the deposit 1 (or if sufficiently thick may be applied with a shovel or trowel) and allowed to set. The body layer for light work is composed, preferably, of a mixture of ground plaster-of-paris and sawdust in proportions of one of plaster and three or four of sawdust. For heavy work silicious sand in substantially the same proportions may be substituted for the sawdust. When the two layers have set, a little water is sprinkled over the exposed surface of the layer 2, this water in a few minutes percolating through the slab onto the glass surface, thereby forming an almost imperceptible film of water between the glass and layer 1. The action of this film is tween the glass plate and layer 1, when the entire slab can be separated or peeled off, as it were, from the glass, as best seen in Fig. 4. When once peeled off, it is allowed to dry slowly and is then ready for the market. In the majority of cases the colors 5 will extend the full depth of the layer 1, this condition depending on the depth to which such colors had gravitated below the surface of the mixture in the can before the same was poured. From this it is obvious that the depth of the colors can be controlled according to circumstances and according to the character of the finished product desired. Where the colors are poured simultaneously with the mixture 1, the same will blend admirably with the latter when once poured. Where, however, the blending is not necessary or desirable, the several streaks or designs of colors may be first poured or applied separately upon the glass and allowed to set, after which the mixture 1 may be poured around them. The result will be about the same, with the exception that they will not be so fully blended. This modification will be often resorted to where it is desirable to form certain characteristic color-streaks in imitation of natural stone or marble, but where it is unnecessary that such streak shall extend the full depth of the facing. (See streaks 5' on the right of Fig. 2.) The glass surface on which the facing mixture is poured need not necessarily be a plane one, but may be pattern-glass of any design. In this way any pattern of facing can be cast, depending on the pattern of the surface of the glass over which it is poured.

The composition of the facing layer 1 may be varied at pleasure. It may be hard or soft, it may contemplate a mere mixture of plaster-of-paris with colors in suspension, or it may be any of the prevailing plaster-cement compositions, which, when once set, become very hard and are susceptible of polish. The composition of the body or backing 2 may be also varied, though the mixture above described works admirably in practice. In some cases the body or backing may be omitted, as is obvious.

It may be stated that where sufficient "sweat" or moisture derived from the composition makes its appearance between the glass and facing then the sprinkling of the water is omitted, as the sweat will be sufficient to overcome the adhesion between the glass and facing. As a rule, the sprinkling is seldom resorted to.

In the matter of backing I may use variable mixtures of common mortar and plaster, the latter being in just sufficient quantities to set or gage the mortar composition.

Having described my invention, what I claim is—

In the manufacture of artificial stone, the process consisting of applying a suitable layer of plaster with an admixture of colors held in suspension therein, upon a smooth glass surface and allowing the same to set, then applying a layer of backing thereto, then sprinkling a suitable quantity of water over the completed slab to permeate the same and form a film between the glass and plaster layer, then peeling off the completed slab, then drying the same, substantially as set forth.

In testimony whereof I affix my signature in presence of two witnesses.

JOHN ESHE.

Witnesses:
EMIL STAREK,
GEORGE L. BELFRY.